United States Patent
Kwatra et al.

(10) Patent No.: US 11,321,487 B2
(45) Date of Patent: May 3, 2022

(54) CONTEXTUAL PRIVACY POLICY IMPLEMENTATION VIA DIGITAL BLURRING SYSTEM

(71) Applicant: International Business Machines Corporation, Armonk, NY (US)

(72) Inventors: Shikhar Kwatra, Durham, NC (US); Adam Lee Griffin, Dubuque, IA (US); Eric Jeffery, Monument, CO (US); Mariya Ali, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 16/550,118

(22) Filed: Aug. 23, 2019

(65) Prior Publication Data

US 2021/0056231 A1  Feb. 25, 2021

(51) Int. Cl.
- G06F 21/62 (2013.01)
- G06F 17/00 (2019.01)
- H04W 12/02 (2009.01)
- H04L 29/06 (2006.01)

(52) U.S. Cl.
CPC ........ G06F 21/6254 (2013.01); H04W 12/02 (2013.01)

(58) Field of Classification Search
CPC ............................ G06F 21/6254; H04W 12/02
See application file for complete search history.

(56) References Cited

U.S. PATENT DOCUMENTS 9,179,105 B1   11/2015 Zeira
9,396,354 B1 *  7/2016 Murphy .................. H04L 51/12
2013/0002891 A1 * 1/2013 Singh ..................... G06Q 40/00
                                                          348/E5.042
2013/0011068 A1 * 1/2013 Albouyeh ............... G06F 21/36
                                                             382/190
2013/0340086 A1   12/2013 Blom
2014/0123208 A1 * 5/2014 Plagemann ........... H04L 63/101
                                                             726/1
2014/0176663 A1   6/2014 Cutler
2014/0196152 A1 * 7/2014 Ur .......................... G06F 21/00
                                                             726/26
2015/0113661 A1 * 4/2015 Mishra ............. H04N 21/41407
                                                             726/26

(Continued)

FOREIGN PATENT DOCUMENTS

CN          101493874          11/2010

OTHER PUBLICATIONS

"What's Wrong With Public Video Surveillance?" American Civil Liberties Union, Apr. 2019, 7 pages.

*Primary Examiner* — Darshan I Dhruv
(74) *Attorney, Agent, or Firm* — VanLeeuwen & VanLeeuwen; Jeffrey S. LaBaw (57) ABSTRACT

An approach is provided for obscuring an individual likeness in a digital image based on a privacy policy. The approach identifies an individual whose likeness appears in a digital image taken by a digital camera with the digital image being stored. A determination is made, based on a privacy policy pertaining to the identified individual, whether to obscure the first individual's likeness in the digital image. Responsive to the determination being positive, the approach obscures the individual's likeness as it appears in the digital image.

20 Claims, 7 Drawing Sheets

(56) References Cited

U.S. PATENT DOCUMENTS

| | | | |
|---|---|---|---|
| 2016/0132719 A1* | 5/2016 | Fithian | G06V 40/172 |
| | | | 345/647 |
| 2016/0148016 A1* | 5/2016 | Rylski | G06V 40/172 |
| | | | 348/143 |
| 2016/0239682 A1* | 8/2016 | Kapadia | G06V 10/462 |
| 2016/0283729 A1* | 9/2016 | Vidhani | G06F 21/6209 |
| 2017/0004602 A1* | 1/2017 | Le Jouan | G06V 40/16 |
| 2017/0061155 A1* | 3/2017 | Gordon | G06F 21/6254 |
| 2017/0126630 A1* | 5/2017 | Ekambaram | H04L 63/102 |
| 2017/0302822 A1* | 10/2017 | Vandeweerd | G06F 21/645 |
| 2018/0032748 A1* | 2/2018 | Rueger | G06V 20/10 |
| 2018/0041693 A1* | 2/2018 | Saraya | G06V 40/172 |
| 2018/0061010 A1* | 3/2018 | Akselrod | H04N 21/4627 |
| 2018/0205550 A1* | 7/2018 | Appleyard | G06V 40/169 |
| 2019/0385328 A1* | 12/2019 | Grosse-Kunstleve | G06T 7/70 |
| 2020/0098096 A1* | 3/2020 | Moloney | G06V 10/454 |
| 2021/0029619 A1* | 1/2021 | Breaux, III | H04W 4/027 |

* cited by examiner

CONTEXTUAL PRIVACY POLICY IMPLEMENTATION VIA DIGITAL BLURRING SYSTEM

BACKGROUND

Digital cameras have proliferated throughout society and are available as stand-alone devices as well as accessories on many other devices, such as smart phones and the like. Due to this proliferations, the number of digital images captured by these cameras has exploded in recent years. This tremendous increase of digital images increases the risk of individual privacy invasions and violations. Currently, there is a lack of 'camera' limits and controls as they relate to privacy protection. In public arenas, for example, an individual's likeness may be considered a valued asset. An individual's physical likeness may generate a revenue stream based on the individual's traits. Because media capture technology has evolved so rapidly, checks and balances to prevent abuses of individuals' privacy are generally absent. As a result, public image capturing could potentially evolve into an even larger privacy concern.

SUMMARY

An approach is provided for obscuring an individual likeness in a digital image based on a privacy policy. The approach identifies an individual whose likeness appears in a digital image taken by a digital camera with the digital image being stored. A determination is made, based on a privacy policy pertaining to the identified individual, whether to obscure the first individual's likeness in the digital image. Responsive to the determination being positive, the approach obscures the individual's likeness as it appears in the digital image.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIGS. 1-7 describe an approach that obscures an individual likeness in a digital image based on a privacy policy. The approach provides a system and method that enables contextual profile policy creations based on specific user or venue/arena defined attributes and opt in/out parameters. This approach permits a user to opt-in and out of defined digital imaging systems and networked devices based on their privacy preferences. An example beneficiary of this approach might be protection of artists of their intellectual property at a venue such as at a comedy club, music concert, movies, etc. The approach provides individuals and venues with the ability to protect themselves or their entertainers. In doing so, the approach adds value and provides needed privacy protection as this described in further detail below.

The approach provides a data gathering system based on user contextual characteristics and privacy profile preferences that considers public geo-fencing perimeters and requirements that results in a virtual obscuring (e.g., "blur," etc.) of facial imagery that prohibits digital image capturing of an individual's likeness based on specific settings within the defined range. The approach also provides data gathering system based on user contextual characteristics and privacy profile preferences that considers public geo-fencing perimeters and requirements that results in a visible obscuring, or blur, of defined tangible content, when the privacy profile prohibits capturing of digital images of an individual's likeness based on specific settings within the defined range. The approach can further provide a system and method that protects all individuals from having their likeness captured in digital images without such individuals' consent by providing a default policy to obscure such individuals' likeness from appearing in digital images in which the individual is included.

In one embodiment, an individual, "A," has a policy defined in a policy management system. The policy management system captures user A's requirements over time that builds a user corpus of data needed for policy management, such as facial recognition data, location data, date/time, privacy details such as features/items to blur in specific contextual relationships. The policy management system shares User A's policy to predefined and/or publicly broadcasts zones which is picked up by mesh network participants. Open and/or forced acceptance are potential embodiments for implementing aspects of policy sharing. The policy management picked up by other user devices (i.e.: user "B") which translate the policy requirements of the broadcasting individual (user "A") to determine whether to obscure user A's likeness in any digital image taken by user "B." When user B attempts to capture an outdoor scene, the approach identifies user A's likeness in the background of the image. As a result, user A's likeness (e.g., face, etc.) are obscured (blurred) on the resulting digital image.

The following provides two example scenarios where the approach described herein can be utilized. The first example is of a mature music artist in the industry does not permit digital images to capture his likeness during his performance. Here, a geo-fence area is defined in the artist's privacy policy that requests that the artist's likeness be blurred in the context of the artist's performance (in the area of the performance, during the time/date of the performance, etc.). When a fan of the artist captures a digital image of the artist during the performance, the artist's privacy policy would cause the resulting image taken by the fan's digital image capturing device, such as the fan's smart phone, to obscure (blur) the artist's likeness in the resulting image. Also in this example, the artist may contract with a professional photographer to capture digital images during the same performance. Obviously, the general (e.g., default) privacy policy that resulted in the fan's digital image to have the artist's likeness obscured would need to be circumvented so that the photographer can capture quality digital images. Here, the artists' privacy policy would allow for the device, or devices, used by the photographer to capture the artist's likeness without obscuring the artist's likeness. In one embodiment, the policy would reference identifiers of devices that are allowed to capture non-obscured images.

In a second example, a 'common person' named "Terry" is in a public tourist area. Terry does not want to be inadvertently captured by other tourists' cameras and be in their photos around these public spaces. His phone broadcasts his privacy policy via a micronet/piconet and other devices in the area receive and process these requests as images are captured. As a result of the privacy policy, Terry's face is obscured at each captured digital image.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 1:
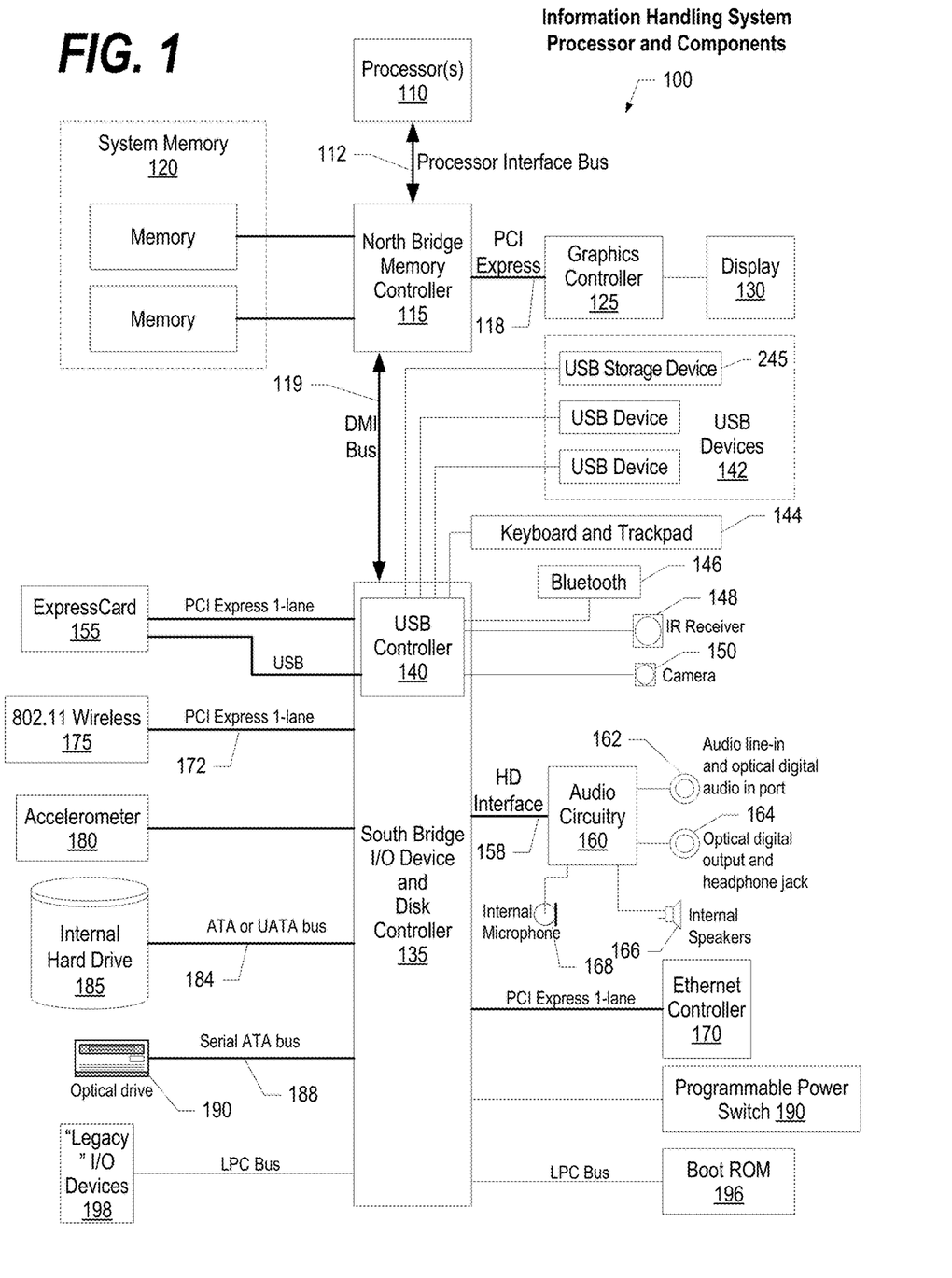
FIG. 1 is a block diagram of a data processing system in which the methods described herein can be implemented.
Figure 2:
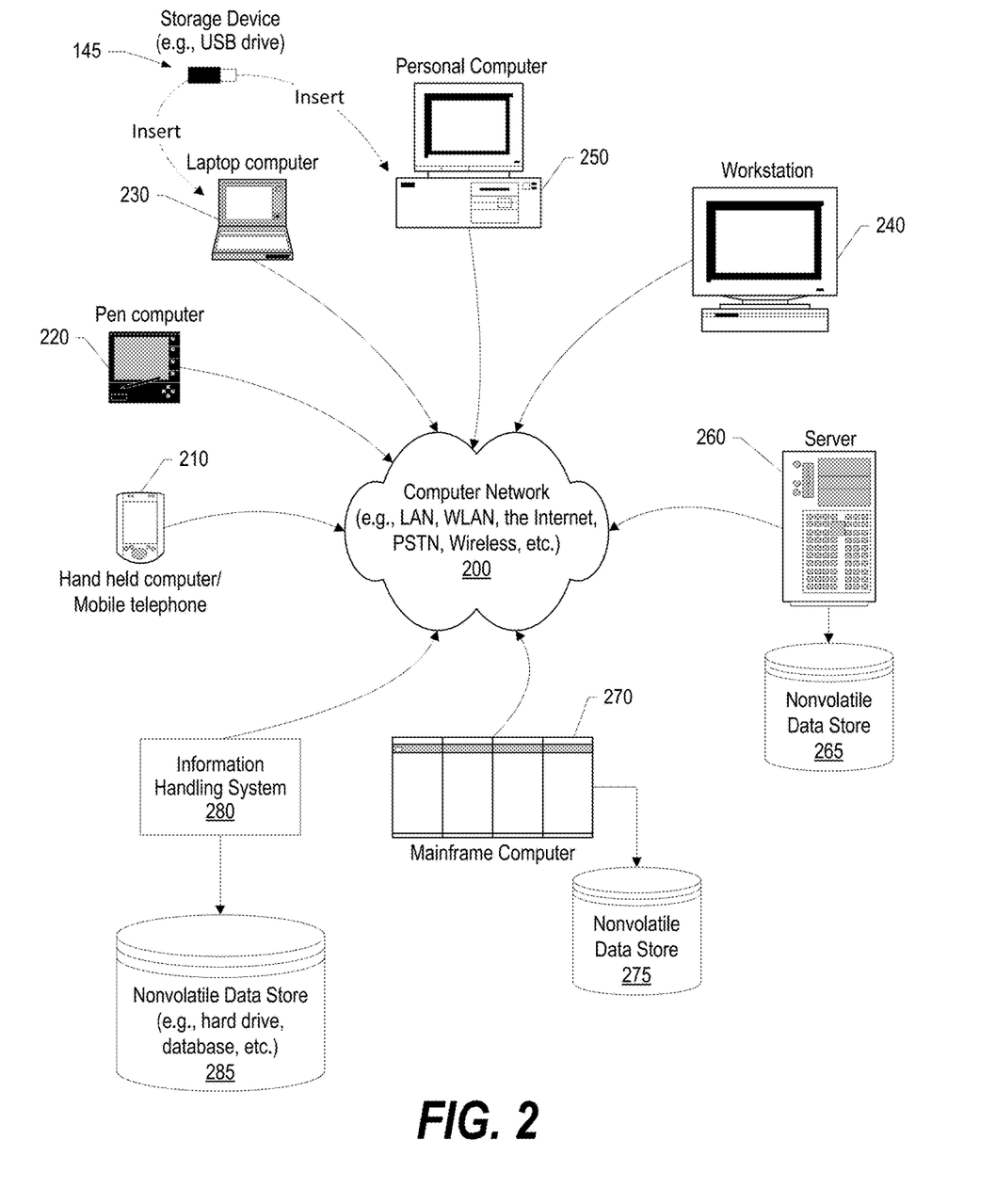
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a device that is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119.

In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Accelerometer 180 connects to Southbridge 135 and measures the acceleration, or movement, of the device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may be a device that can take many forms. For example, an information handling system may take the form of a desktop device, server device, portable device, laptop device, notebook device, or other form factor device. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of devices that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling system devices include pen, or tablet, device 220, laptop, or notebook, device 230, workstation device 240, personal computer system device 250, and server device 260. Other types of information handling system devices that are not individually shown in FIG. 2 are represented by information handling system device 280. As shown, the various information handling system devices can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
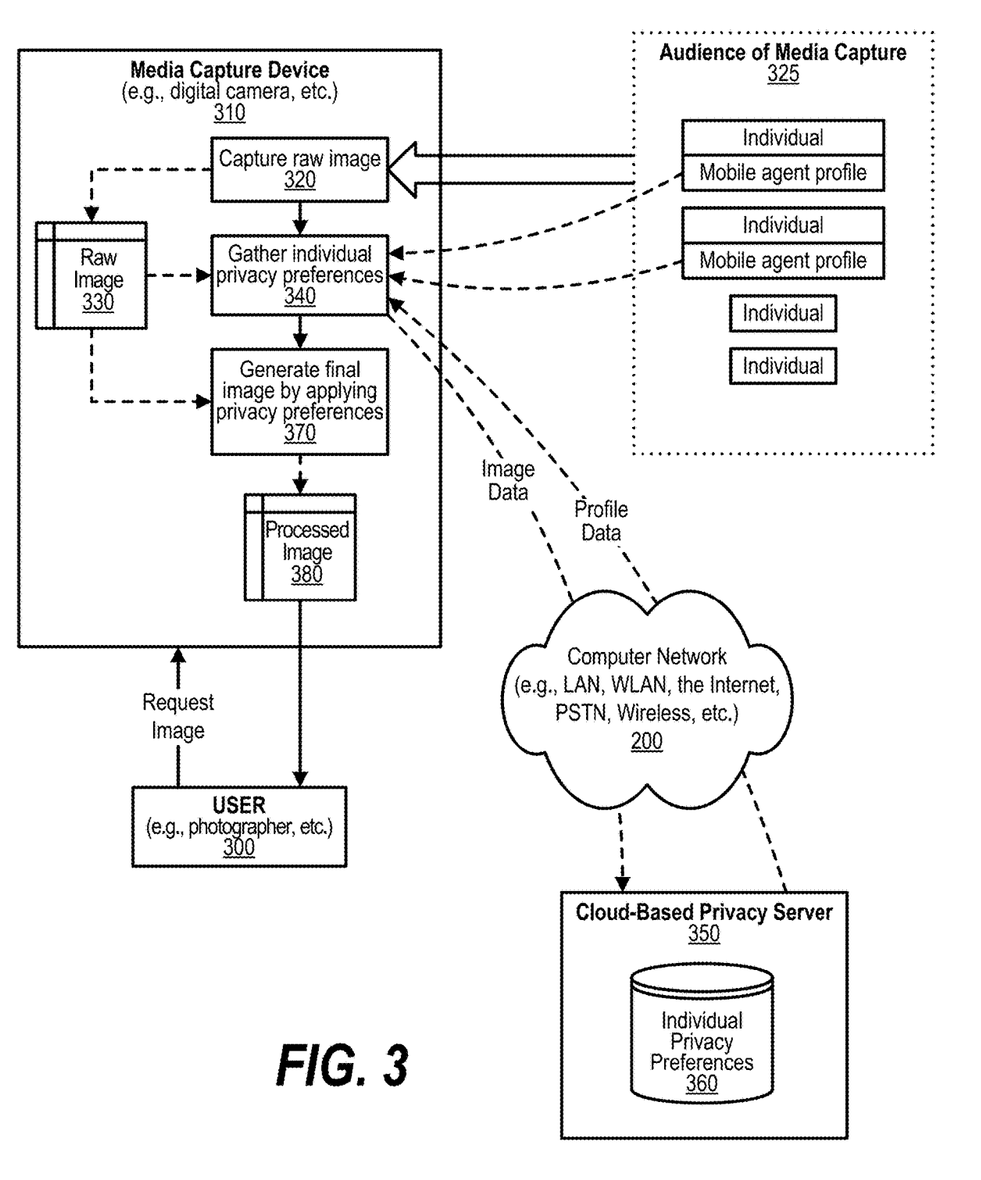
FIG. 3 is a component diagram that shows the various components included in a system that provides a contextual privacy policy related to captured digital images.

FIG. 3 is a component diagram that shows the various components included in a system that provides a contextual privacy policy related to captured digital images. User 300, such as a photographer or user of any device, such as a smart phone, that includes a digital camera, uses digital image capture device 310, such as a digital camera, smart phone, or the like, to capture a digital image depicted as 325. The subject of the digital image capture includes an audience that might include one or more individuals. These individuals can have privacy policies that can be stored locally, such on the individual's mobile device (e.g., smart phone, etc.) or remotely on a network resource, such as a server 350 hosting individuals privacy policies on data store 360, with the resource being accessible from a computer network 200, such as the Internet.

Digital media image capture device 310 performs various processes to respect the privacy profiles of the various individuals included in the area that was captured by the device. The raw image of the digital image capture is stored in memory area 330. The raw image, as the name implies, has not been processed to obscure, or blur, the individual likenesses of any of the individuals included in the image. At step 320, the device captures the raw image and stores the image in memory area 330. In one embodiment, the raw image is inaccessible by the user of the device. At step 340, the process gathers the individual privacy policies corresponding to the individuals whose likenesses are included in the image stored in memory area 330. At step 370, the process generates a final image by applying the individual privacy policies to the individuals' likenesses that were captured and stored in the raw image. Some individuals may have a policy allowing the taking of their likeness by the user in the context of the setting (e.g., time/date, place, identity of the user, etc.) in which the image was captured. However, other users may have a privacy policy requesting that their likeness be obscured. The resulting image is stored in memory area 380 and, as described above, may have the likeness of some individuals being obscured while the likeness of other individuals may be left intact. The processed image is made available to user 300, such as allowing the user to view the processed image, print the processed image, upload the processed image to a social media or other web site, or perform other operations on the processed image.

In one embodiment, the raw image is sent to an external service provider over computer network 200 with the external service provider obscuring the various individual likenesses in the raw image according to such individuals' privacy policies. The external service provider would then send the processed image back to the user's device via the computer network.

Figure 4:
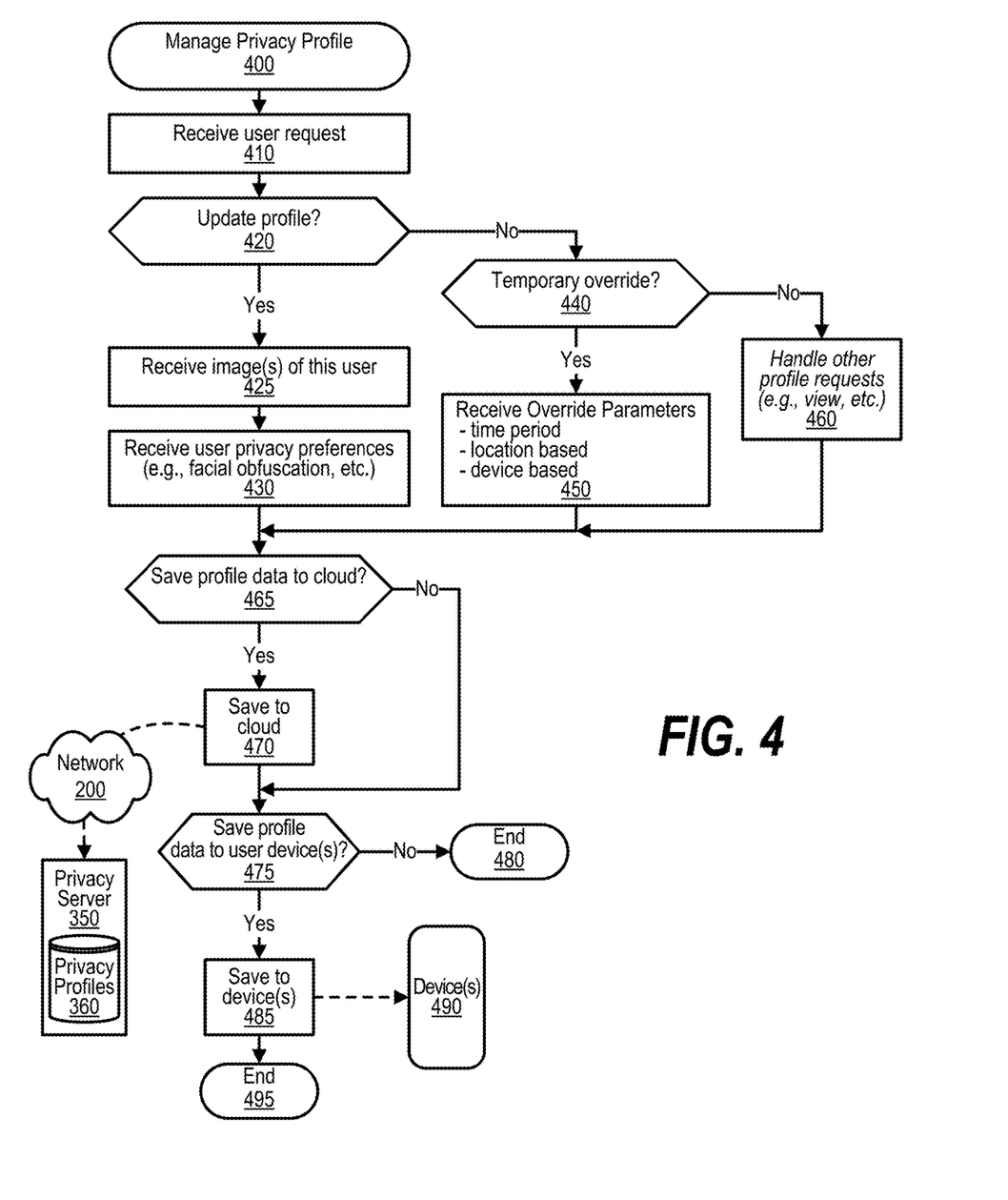
FIG. 4 is a depiction of a flowchart showing the steps taken to manage an individual's privacy profile.

FIG. 4 is a depiction of a flowchart showing the steps taken to manage an individual's privacy profile. FIG. 4 processing commences at 400 and shows the steps taken by a process that manages an individual's privacy profile. At step 410, the process receives the user's request. The process determines as to whether the request is to update the individual's profile (decision 420). If the request is to update the individual's profile, then decision 420 branches to the 'yes' branch whereupon steps 425 and 430 are performed. On the other hand, if the request is not to update the individual's profile, then decision 420 branches to the 'no' branch to handle other considerations.

If the request is to update the individual's privacy policy, then steps 425 and 430 are performed. At step 425, the process receives image(s) of this individual. These images will be used to compare with images captured by another user to determine whether this individual's likeness was captured in the image taken by the other user. At step 430, the process receives the individual's privacy preferences, such as the facial obfuscation desired and whether the individual's default privacy policy to have the individual's likeness obscured unless the individual consents to the image either by granting permission or setting up a context (e.g., time/date, place, photographer identifier, etc.) where the individual's likeness may be captured without obscuring the individual's likeness in the resulting images.

Returning to decision 420, if the request is not to update the individual's privacy policy, then decision 420 branches to the 'no' branch whereupon the process next determines whether the request is for a temporary override (decision 440). If a temporary override is being requested, then decision 440 branches to the 'yes' branch whereupon, at step 450, the temporary override parameters are received defining the context of images that are permitted to be taken of the individual's likeness, such as the time period, location, and identifier of the device capturing the individual's likeness. On the other hand, if a temporary override is not being requested, then decision 440 branches to the 'no' branch whereupon, at step 460, some other type of privacy policy request is handled, such as allowing the user to view his or her current privacy profile.

The process determines as to whether the individual wishes to save the privacy policy in network-accessible resource storage (decision 465). If the individual wishes to save the privacy policy in network-accessible resource storage, then decision 465 branches to the 'yes' branch whereupon, at step 470, the process saves the individual's privacy policy to data store 360 which is maintained by network resource (e.g., server, etc.) 350 with the policy being transmitted over computer network, such as the Internet, 200. On the other hand, if the individual does not wish to save the privacy policy in network-accessible resource storage, then decision 465 branches to the 'no' branch bypassing step 470.

The process determines as to whether the individual wishes to save the privacy policy data to one or more user devices 490 (decision 475). If the individual wishes to save the privacy policy data to one or more user devices (e.g., laptop computer, tablet, smart phone, etc.), then decision 475 branches to the 'yes' branch whereupon, at step 485, the individual's privacy policy is stored on one or more device 490. On the other hand, if the individual does not wish to save the privacy policy data to one or more user devices, then decision 475 branches to the 'no' branch bypassing step 485. FIG. 4 processing thereafter ends at 495.

Figure 5:
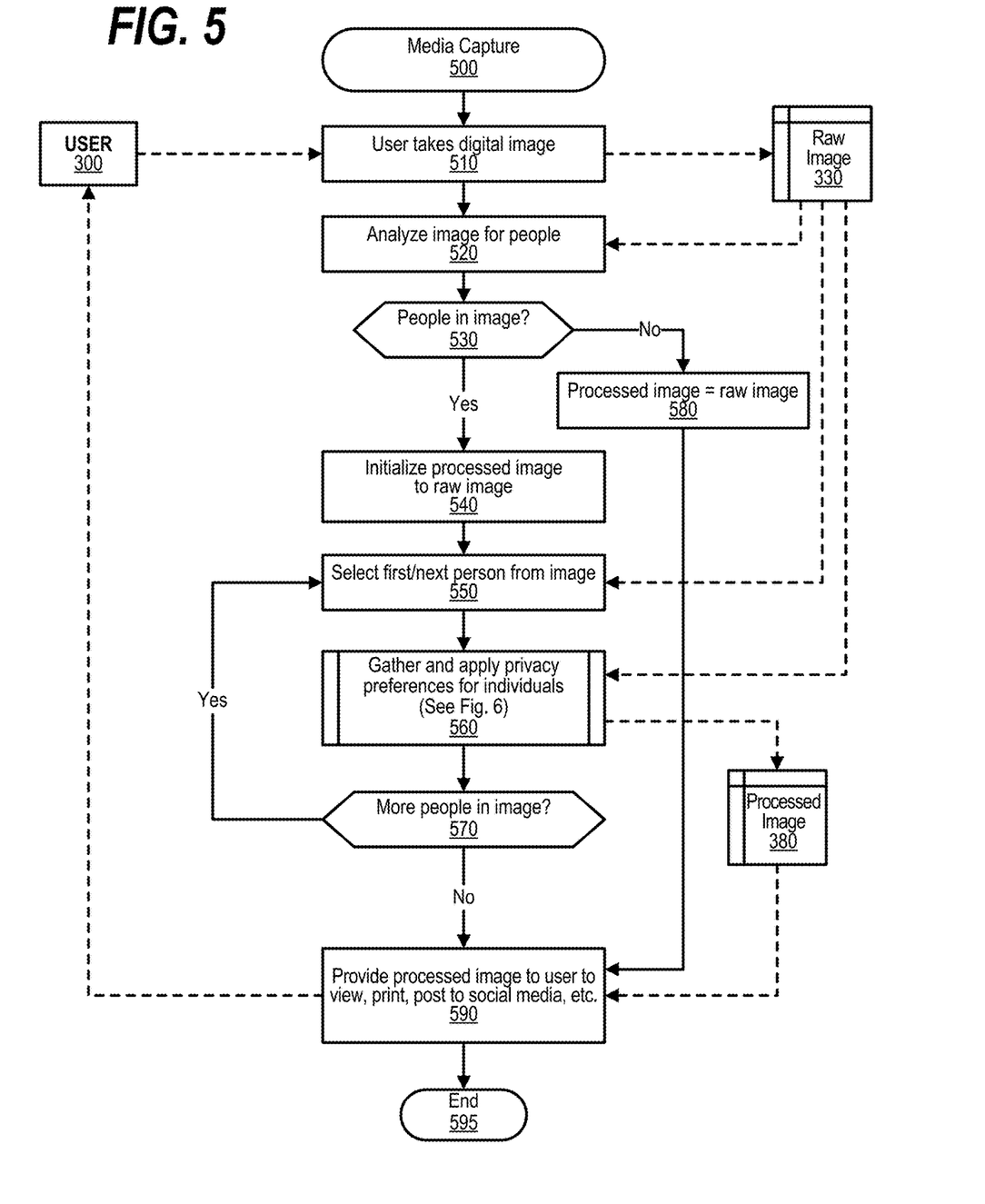
FIG. 5 is a depiction of a flowchart showing the steps taken during media capture in a system that provides a contextual privacy policy related to captured digital images.

FIG. 5 is a depiction of a flowchart showing the steps taken during media capture in a system that provides a contextual privacy policy related to captured digital images. FIG. 5 processing commences at 500 and shows the steps taken by a process that performs a media capture operation, such as at a stand-alone digital camera, or a digital camera included in a device such as a smart phone. At step 510, user 300 takes a digital image with the device, such as by looking at a viewfinder or image capture screen and pressing a trigger (e.g., soft key, etc.) to instruct the device to take a single digital image (photo) or a series of digital images (video). The resulting raw digital image is stored in memory area 330.

At step 520, the process analyzes the raw image for individuals that might be included in the image that was captured by the device. The process determines as to whether the likeness of one or more individuals were included in the raw image (decision 530). If likenesses of individuals were included in the image, then decision 530 branches to the 'yes' branch to perform steps 540 through 570 to apply privacy policies to those individuals. On the other hand, if no individuals were included in the image, then decision 530 branches to the 'no' branch bypassing steps 540 through 570 with step 580 being performed to set the processed image data (memory area 380) as being the same as the raw image data (memory area 330).

Steps 540 through 570 are performed when individuals are included in the raw image data that was captured by the digital camera device. At step 540, the process initializes the processed image data stored in memory area 380 to be the same as the raw image data that is stored in memory area 330. At step 550, the process selects the likeness of the first individual from the image data. At predefined process 560, the process performs the Gather and Apply Privacy Preferences for Individuals routine (see FIG. 6 and corresponding text for processing details). This routine determines if the likeness of the selected individual should be obscured, such as by blurring the individual's face so that the individual's face is not recognizable. The results of this routine, if likeness obscuring takes place, is an alteration (blurring) of image features of the individual's likeness in the processed image data that is stored in memory area 380.

The process next determines whether the likenesses of more individuals were found in the raw image data (decision 570). If more individual likenesses are found, then decision 570 branches to the 'yes' branch which loops back to step 550 to select and process the likeness of the next individual as described above. This looping continues until all of the individual likenesses have been processed, at which point decision 570 branches to the 'no' branch exiting the loop. At step 590, the process provides the processed image data from memory area 380 to user 300 so that the user can view the image, print the image, post the image to social media or other website(s), etc. FIG. 5 processing thereafter ends at 595.

Figure 6:
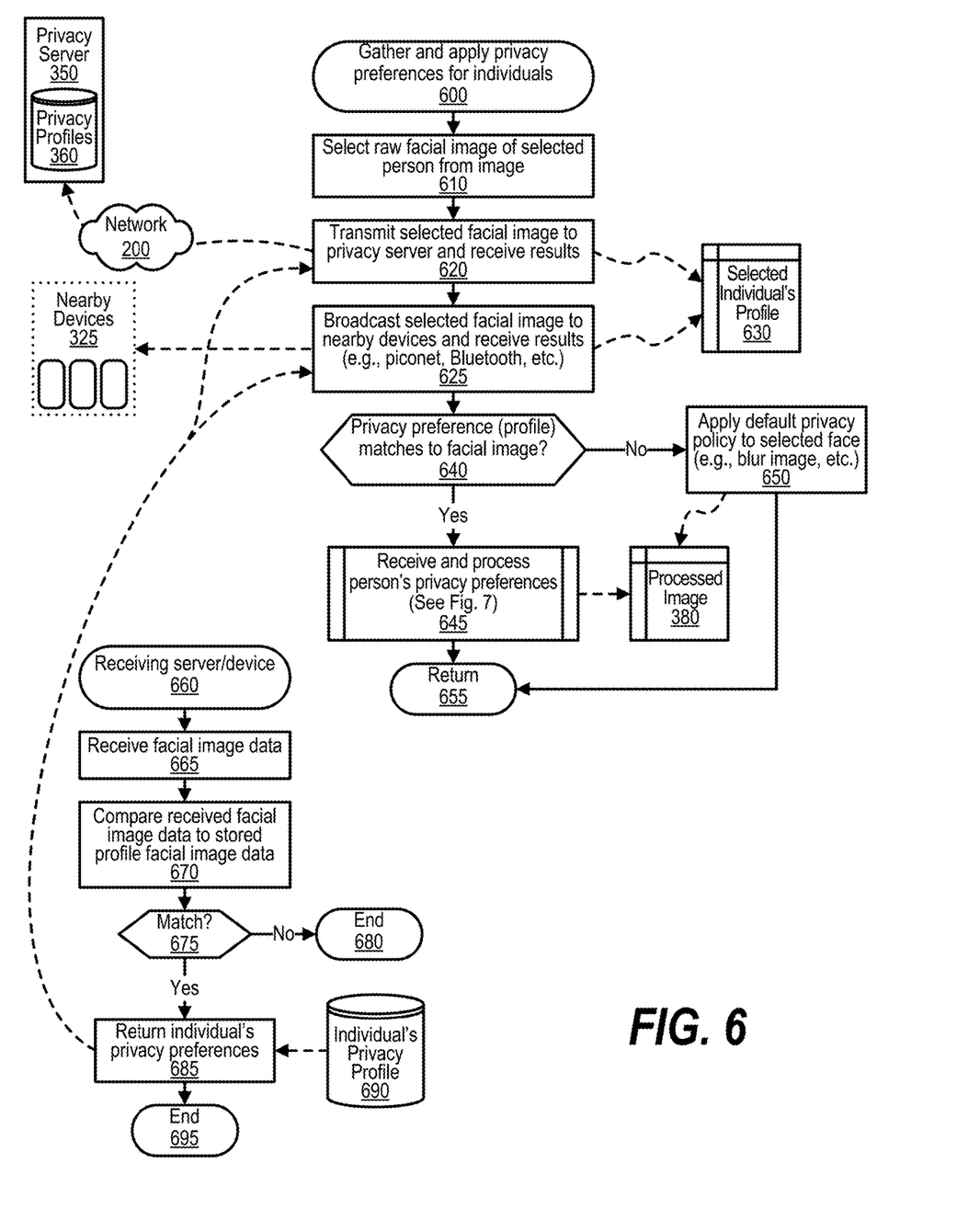
FIG. 6 is a depiction of a flowchart showing steps taken to gather and apply privacy preferences for individuals included in a digital image.

FIG. 6 is a depiction of a flowchart showing steps taken to gather and apply privacy preferences for individuals included in a digital image. FIG. 6 processing commences at 600 and shows the steps taken by a process that gathers and applies privacy preferences for individuals whose likenesses are included in a digital image. At step 610, the process selects the raw facial image of the selected individual from the digital image data. At step 620, the process transmits the selected facial image to privacy server 350 and receives results. The privacy server compares the facial image data to previously stored facial image data to determine if an individual has set up a privacy policy that is stored in data store 360 and managed by the privacy server. If a match is found, then the matching individual's privacy policy is returned to the process at step 620 as shown by the process that commences at step 660. At step 625, the process broadcasts the facial image data of the selected individual to nearby devices 325 using a wireless protocol (e.g., Bluetooth, piconet, WiFi, etc.) and receives results, as shown by the process that commences at step 660. The gathered privacy profile data is stored in memory area 630.

The process determines as to whether a privacy policy (profile) was found that matches the facial image of the selected individual (decision 640). If the individual's privacy policy was found, then decision 640 branches to the 'yes' branch whereupon, at predefined process 645, the process performs the Receive and Process Person's Privacy Preferences Routine (see FIG. 7 and corresponding text for processing details). This routine might result in the obscuring (e.g., blurring, etc.) of the selected individual's facial features in the individual's likeness that is included in the processed image data that is stored in memory area 380. On the other hand, if a privacy policy was not found for the selected individual, then decision 640 branches to the 'no' branch whereupon, at step 650, the process applies a default privacy policy to the selected individual's likeness (e.g., obscuring or blurring the individual's facial features that appear in the processed image stored in memory area 380. FIG. 6 processing thereafter returns to the calling routine (see FIG. 5) at 655.

The FIG. 6 processing that is performed by the receiving privacy server or nearby device is shown commencing at 660. At step 665, the process receives the facial image data that the requestor sent of the individual's likeness that was included in the raw digital image. At step 670, the process compares the received facial image data to the stored facial image data of the individual, or individuals, corresponding to the privacy policy or policies of the server or device. The process determines as to whether a match of an individual's facial features was found (decision 675). If a match was found, then decision 675 branches to the 'yes' branch whereupon, at step 685, the process returns individual's privacy policy to the requestor and the process ends at 695. On the other hand, if a match was not found, then decision 675 branches to the 'no' branch whereupon processing ends at 680 without returning a privacy policy to the requestor.

Figure 7:
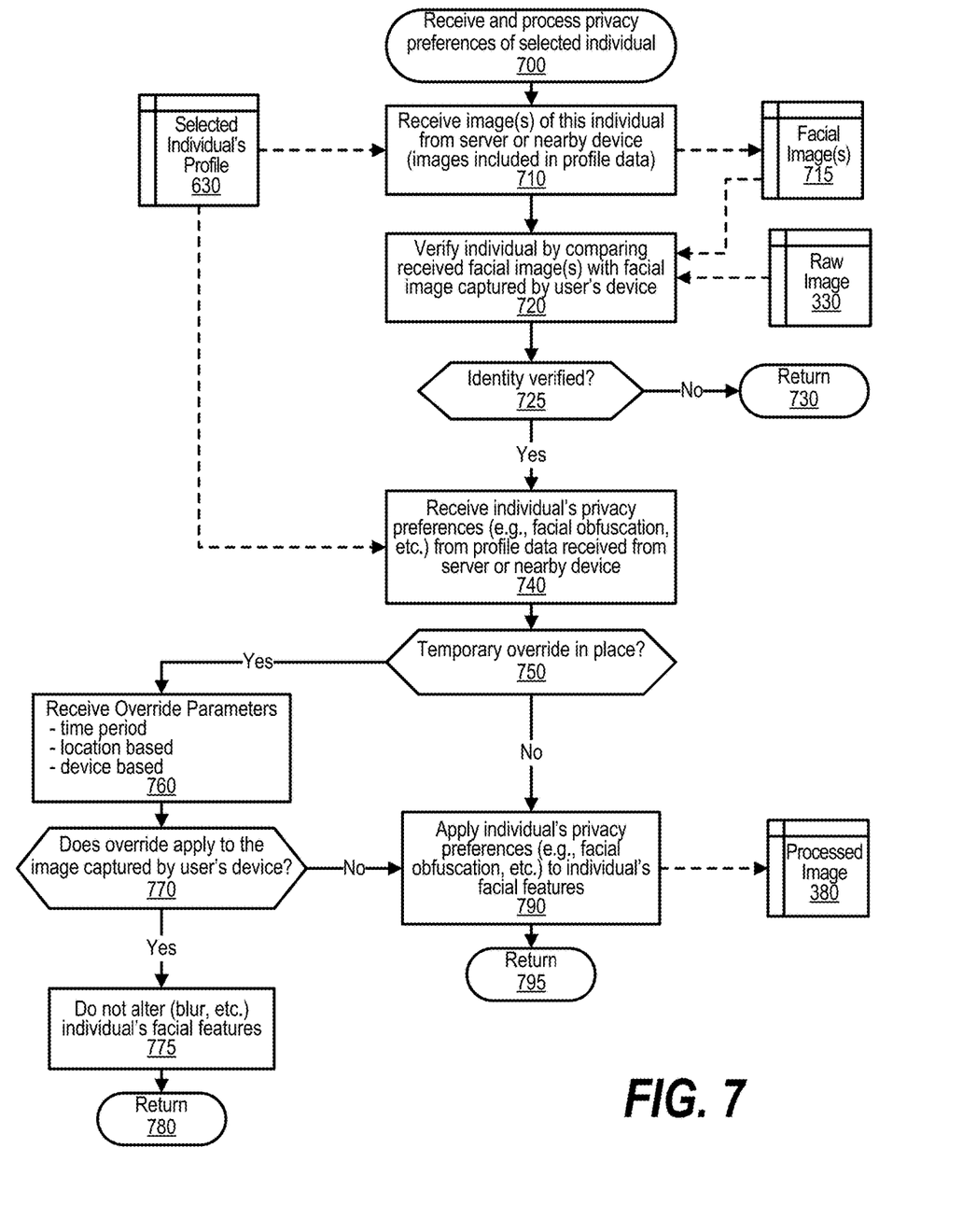
FIG. 7 is a depiction of a flowchart showing the steps taken to receive and process privacy preferences of a selected individual whose image is included in a captured digital image.

FIG. 7 is a depiction of a flowchart showing the steps taken to receive and process privacy preferences of a selected individual whose image is included in a captured digital image. FIG. 7 processing commences at 700 and shows the steps taken by a process that receives and processes the privacy preferences found in a privacy profile of a selected individual. At step 710, the process receives one or more digital images of this individual's likeness from a privacy server or from a nearby device. The images were included in the individual's privacy policy of the individual's likeness, such as facial image(s). The received images of the individual's likeness are stored in memory area 715.

At step 720, the process verifies the selected individual by comparing the received facial images stored in memory area 715 with the facial image data that was captured by the user's digital camera device with this data being retrieved from memory area 330. Based on the comparison, the process determines whether the identity of the individual is verified (decision 725) before applying such individual's privacy preferences. If the selected individual's identity is verified, then decision 725 branches to the 'yes' branch to perform steps 740 through 795. On the other hand, if the selected individual's identity is not verified, then decision 725 branches to the 'no' branch and processing returns to the calling routine (see FIG. 6) at 730.

Steps 740 through 795 are performed when the selected individual's identity has been verified. At step 740, the process receives the selected individual's privacy preferences (e.g., facial obfuscation, etc.) from the individual's privacy profile that was received from the privacy server or from a nearby device. The process determines as to whether the individual's privacy policy indicates that a temporary override in place (decision 750). If a temporary override is in place, then decision 750 branches to the 'yes' branch to perform steps 760 through 780. On the other hand, if a temporary override is not in place, then decision 750 branches to the 'no' branch whereupon, at step 790 the process applies the selected individual's standard privacy preferences (e.g., facial obfuscation, etc.) to the likeness of the selected individual's facial features as they appear in the digital image data after which processing returns to the calling routine (see FIG. 6) at 795.

Steps 760 through 780 are performed when a temporary override is indicated in the individual's privacy policy. At step 760, the process receives override parameters identifying the context of the override with the parameters possibly including the time period (date, times, etc.), the geographic location of the override, and any device-based override parameters that identify particular image capturing devices to which the override applies.

The process determines as to whether the override applies to the image captured by user's device (decision 770). If the override applies to the image captured by user's device, then decision 770 branches to the 'yes' branch whereupon, at step 775, the process refrains from obscuring (blurring, etc.) the likeness of the selected individual's facial features that appear in the processed image stored in memory area 380 and processing returns to the calling routine (see FIG. 6) at 780. On the other hand, if the override does not apply to the image captured by user's device, then decision 770 branches to the 'no' branch whereupon, at step 790 the process applies the selected individual's standard privacy preferences (e.g., facial obfuscation, etc.) to the likeness of the selected individual's facial features as they appear in the digital image data after which processing returns to the calling routine (see FIG. 6) at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:

identifying a first individual whose likeness appears in a digital image taken by a first digital camera with the digital image being stored in the memory;

retrieving a first privacy policy from a privacy data store accessible over a computer network, wherein the first privacy policy is set by the first individual and includes one or more privacy preferences and one or more override parameters, and wherein one of the one or more override parameters includes a device-based override parameter that corresponds to one or more digital cameras allowed to capture non-obscured images of the first individual;

determining, based on the one or more privacy preferences and the device-based override parameter, whether to obscure the first individual's likeness in the digital image, wherein the determining is based on whether the first digital camera is one of the one or more digital cameras allowed to capture non-obscured images of the first individual; and responsive to the determination being positive, obscuring the first individual's likeness as it appears in the digital image.

2. The method of claim 1 further comprising:

identifying a second individual whose likeness also appears in the digital image taken by the first digital camera;

determining, based on a second privacy policy set by the second individual, whether to obscure the second individual's likeness in the digital image, wherein the determining is based on whether the first digital camera is allowed to capture non-obscured images of the second individual; and responsive to the determination being negative, refraining from obscuring the second individual's likeness as it appears in the digital image.

3. The method of claim 2 wherein the second privacy policy is received from a selected mobile device corresponding to the second individual, the method comprising:

wirelessly transmitting, from the first digital camera, a request to one or more devices including the selected mobile device, wherein the request identifies the second individual; and wirelessly receiving, at the first digital camera, the second privacy policy from the selected mobile device.

4. The method of claim 1 wherein the first privacy policy includes a context that identifies at least one geographic location where the first individual's likeness is to be obscured.

5. The method of claim 1 wherein the first privacy policy includes an image capturing identifier corresponding to the first digital camera, the method further comprising:
   wirelessly transmitting, from the first digital camera, a request that identifies the first individual and further includes the image capturing identifier; and
   wirelessly receiving, at the first digital camera, the first privacy policy in response to the request.

6. The method of claim 1 further comprising:
   requesting the first privacy policy from a network resource accessible from the computer network; and
   receiving the first privacy policy from the network resource.

7. The method of claim 1 wherein the first privacy policy that corresponds to the first individual is a default policy.

8. An information handling system comprising:
   one or more processors;
   a memory coupled to at least one of the processors; and
   a set of computer program instructions stored in the memory and executed by at least one of the processors in order to perform actions comprising:
   identifying a first individual whose likeness appears in a digital image taken by a first digital camera with the digital image being stored in the memory;
   receiving a first privacy policy from a privacy data store accessible over a computer network, wherein the first privacy policy is set by the first individual and includes one or more privacy preferences and one or more override parameters, and wherein one of the override parameters includes a device-based override parameter that corresponds to one or more digital cameras allowed to capture non-obscured images of the first individual;
   determining, based on the one or more privacy preferences and the device-based override parameter, whether to obscure the first individual's likeness in the digital image, wherein the determining is based on whether the first digital camera is one of the one or more digital cameras allowed to capture non-obscured images of the first individual; and
   responsive to the determination being positive, obscuring the first individual's likeness as it appears in the digital image.

9. The information handling system of claim 8 wherein the actions further comprise:
   identifying a second individual whose likeness also appears in the digital image taken by the first digital camera;
   determining, based on a second privacy policy set by the second individual, whether to obscure the second individual's likeness in the digital image, wherein the determining is based on whether the first digital camera is allowed to capture non-obscured images of the second individual; and
   responsive to the determination being negative, refraining from obscuring the second individual's likeness as it appears in the digital image.

10. The information handling system of claim 9 wherein the second privacy policy is received from a selected mobile device corresponding to the second individual, the actions comprising:
   wirelessly transmitting, from the first digital camera, a request to one or more devices including the selected mobile device, wherein the request identifies the second individual; and
   wirelessly receiving, at the first digital camera, the second privacy policy from the selected mobile device.

11. The information handling system of claim 8 wherein the first privacy policy includes a context that identifies at least one geographic location where the first individual's likeness is to be obscured.

12. The information handling system of claim 8 wherein the first privacy policy includes an image capturing identifier corresponding to the first digital camera, wherein the actions further comprise:
   wirelessly transmitting, from the first digital camera, a request that identifies the first individual and further includes the image capturing identifier; and
   wirelessly receiving, at the first digital camera, the first privacy policy in response to the request.

13. The information handling system of claim 8 wherein the actions further comprise:
   requesting the first privacy policy from a network resource accessible from the computer network; and
   receiving the first privacy policy from the network resource.

14. The information handling system of claim 8 wherein the first privacy policy that corresponds to the first individual is a default policy.

15. A computer program product stored in a computer readable storage medium, comprising computer program code that, when executed by an information handling system, causes the information handling system to perform actions comprising:
   identifying a first individual whose likeness appears in a digital image taken by a first digital camera with the digital image being stored in the memory;
   retrieving a first privacy policy from a privacy data store accessible over a computer network, wherein the first privacy policy is set by the first individual and includes one or more privacy preferences and one or more override parameters, and wherein one of the override parameters includes a device-based override parameter that corresponds to one or more digital cameras allowed to capture non-obscured images of the first individual;
   determining, based on the one or more privacy preferences and the device-based override parameter, whether to obscure the first individual's likeness in the digital image, wherein the determining is based on whether the first digital camera is one of the one or more digital cameras allowed to capture non-obscured images of the first individual; and
   responsive to the determination being positive, obscuring the first individual's likeness as it appears in the digital image.

16. The computer program product of claim 15 wherein the actions further comprise:
   identifying a second individual whose likeness also appears in the digital image taken by the first digital camera;
   determining, based on a second privacy policy set by the second individual, whether to obscure the second individual's likeness in the digital image, wherein the determining is based on whether the first digital camera is allowed to capture non-obscured images of the second individual; and responsive to the determination being negative, refraining from obscuring the second individual's likeness as it appears in the digital image.

17. The computer program product of claim 16 wherein the second privacy policy is received from a selected mobile device corresponding to the second individual, the actions comprising:
   wirelessly transmitting, from the first digital camera, a request to one or more devices including the selected mobile device, wherein the request identifies the second individual; and
   wirelessly receiving, at the first digital camera, the second privacy policy from the selected mobile device.

18. The computer program product of claim 15 wherein the first privacy policy includes a context that identifies at least one geographic location where the first individual's likeness is to be obscured.

19. The computer program product of claim 16 wherein the first privacy policy includes an image capturing identifier corresponding to the first digital camera, wherein the actions further comprise:
   wirelessly transmitting, from the first digital camera, a request that identifies the first individual and further includes the image capturing identifier; and
   wirelessly receiving, at the first digital camera, the first privacy policy in response to the request.

20. The computer program product of claim 15 wherein the actions further comprise:
   requesting the first privacy policy from a network resource accessible from the computer network; and
   receiving the first privacy policy from the network resource.

* * * * *